Figure 1:
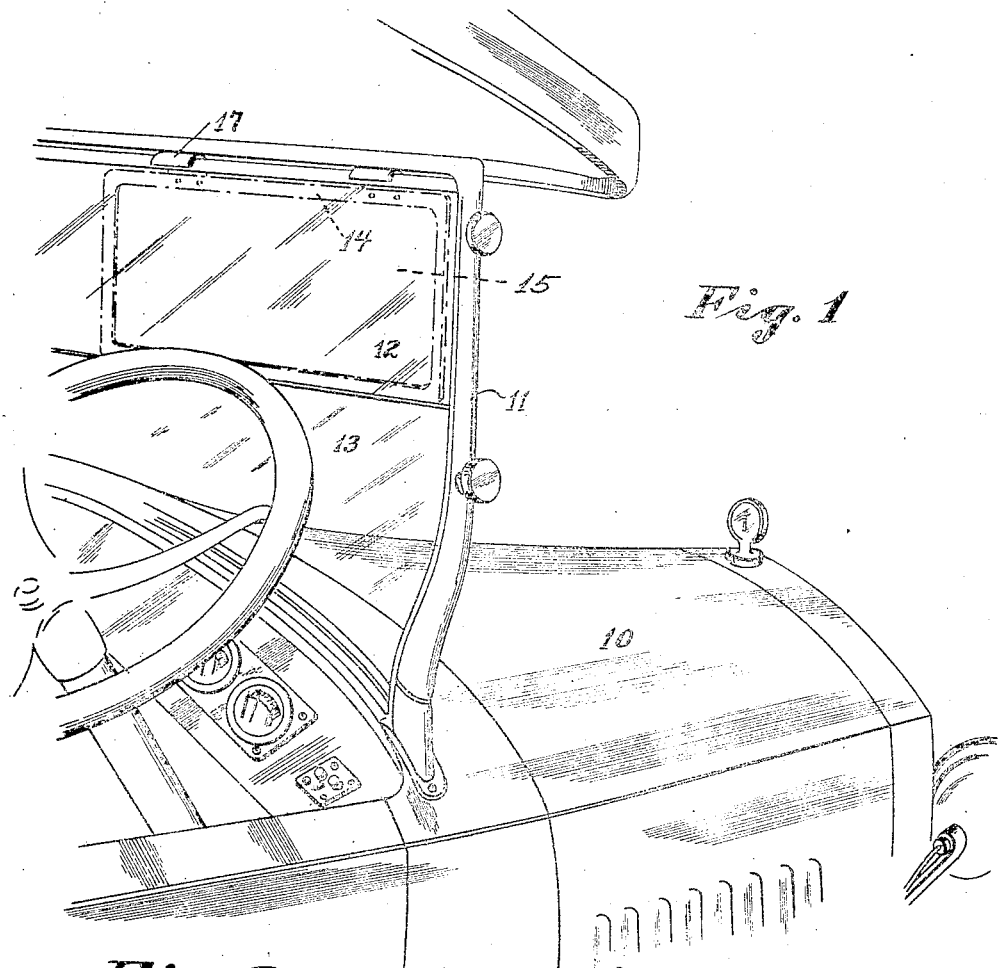

S. H. WINCHESTER.
AUXILIARY SCREEN FOR WINDSHIELDS.
APPLICATION FILED JULY 24, 1920.

1,409,987.

Patented Mar. 21, 1922.

Inventor
S. H. Winchester

UNITED STATES PATENT OFFICE.

SIDNEY H. WINCHESTER, OF CORINNA, MAINE.

AUXILIARY SCREEN FOR WINDSHIELDS.

1,409,987.　　　　　Specification of Letters Patent.　　Patented Mar. 21, 1922.

Application filed July 24, 1920. Serial No. 398,615.

*To all whom it may concern:*

Be it known that I, SIDNEY H. WINCHESTER, a citizen of the United States, residing at Corinna, in the county of Penobscot and State of Maine, have invented certain new and useful Improvements in Auxiliary Screens for Windshields, of which the following is a specification.

This invention relates to an improved auxiliary screen for motor vehicle wind shields and has as one of its principal objects to provide a device of this character which may be readily attached to any ordinary wind shield for neutralizing the glare of the headlights of an approaching vehicle.

The invention has as a further object to provide a device which may be used either upon the inside or outside of the wind shield and which, when so desired, may be moved along the wind shield to a position out of the way of the vision of the driver.

And the invention has as a still further object to provide a device which may be employed as a rain guard for the wind shield and which may be adjustably tilted to any desired angular position with respect to the wind shield.

Other and incidental objects will appear hereinafter.

Figure 2:
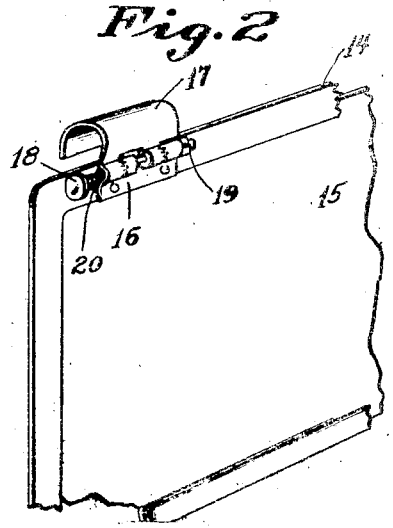
Figure 3:
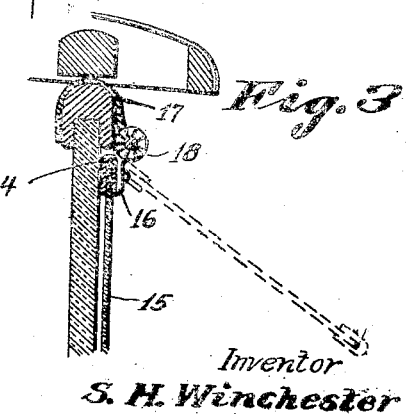

In the drawings:

Figure 1 is a perspective view showing my improved device upon the wind shield of a motor vehicle of conventional design, Figure 2 is a fragmentary perspective view showing one of the suspension hooks of the device, and Figure 3 is a fragmentary vertical sectional view particularly illustrating the manner in which the suspension hooks of the device are formed to engage over the frame of the wind shield, this view also showing in dotted lines the manner in which the device may be tilted with respect to the wind shield.

Referring now more particularly to the drawings, I have shown my improved device in connection with the wind shield of a motor vehicle 10 of conventional design. Rising above the cowl of the vehicle are the usual posts or brackets 11 and supported between these posts is the wind shield which, as is usual, is constructed of an upper section 12 and a lower section 13 pivoted upon the posts. In carrying the invention into effect, I employ a preferably oblong frame 14. This frame may be formed of sheet metal or other suitable material and the side and end members thereof are channel shaped in cross section. Fixed within the frame is a translucent or semi-transparent screen member 15. This member may be formed of celluloid, glass or other approved material, colored in a manner to filter the light passing therethrough. Fixed to the upper side member of the frame near the ends thereof are hinge plates 16 having alined hinge lugs and swingingly connected to said plates are suspension hooks 17 having hinge lugs mating with the hinge lugs of said plates. Fitting through the lugs are pivot pins 18 pivotally connecting the hooks with said plates and, as will be observed, the pivot pins are, at their outer ends, formed with milled heads while, at their inner ends, said pins carry nuts 19. On corresponding ends of the pivot lugs of the suspension hooks 17 are formed suitable teeth while the confronting ends of the pivot lugs of the hinge plates are provided with similar teeth and surrounding the pivot pins 18 are springs 20 bearing against the hooks and acting to press the teeth of the lugs thereof into engagement with the teeth of the lugs of the hinge plates.

The suspension hooks 17 are formed of suitable resilient sheet metal and, as particularly shown in Figure 3 of the drawing, are shaped to snugly fit the upper side member of the frame of the upper section 12 of the wind shield engaging thereover and clamping said frame member. The suspension hooks will thus effectually support the screen upon the wind shield and, as particularly brought out in Figure 1, the screen is of a width substantially equal to the width of said section. Consequently, by arranging the screen in front of the driver of the vehicle, lying flat against the upper section of the wind shield, the driver may look through the screen 15 so that said member will serve to protect the eyes of the driver from the glare of the sun and, at night, will serve to neutralize the glare of the headlights of an oncoming vehicle. However, when it is desired not to use the screen, it may be simply shifted laterally along the upper section of the wind shield to a position out of the way of the driver. When the screen is thus employed as a light screen it may be arranged either upon the inside or the outside of the wind shield. However, by arranging the device at the outer side of the wind shield, it may also be employed as a rain guard therefor. When so used, the device is, as suggested in dotted lines in Figure 3, swung outwardly and upwardly upon the pivot pins 18 to extend at an angle to the wind shield so that the device will prevent the rain from striking against the upper section of the wind shield and accordingly hampering the vision of the driver therethrough. As will be seen, when the suspension hooks 17 are engaged with the upper side member of the frame of the upper section of the wind shield and accordingly held fixed, the springs 20 will cause the teeth of the hinge lugs of said hooks to coact with the teeth of the hinge lugs of the plates 16 for yieldably locking the screen in adjusted position. I accordingly provide a particularly effective device for the purpose set forth and a device which, as will now be appreciated, may readily be employed upon substantially any conventional design of motor vehicle wind shield.

Having thus described the invention, what is claimed as new is:

An auxiliary screen for wind shields including a frame, a screen member carried thereby, hinge plates fixed to the frame and each having spaced alined hinge loops, resilient arcuate suspension hooks for the frame each having spaced alined hinge loops, the loops of each of said hooks mating with the loops of one of said plates respectively, pivot pins extending freely through said loops pivotally connecting the hooks with the frame whereby the frame may be adjustably swung with respect to the loops, the loops of the plates and the loops of the hooks being formed at their confronting ends with coacting teeth, springs surrounding the pivot pins and bearing against the hooks for yieldably locking the frame in adjusted position relative to the hooks, and adjustable means carried by the pins whereby the tension of said springs may be varied.

In testimony whereof I affix my signature.

SIDNEY H. WINCHESTER. [L. S.]